UNITED STATES PATENT OFFICE.

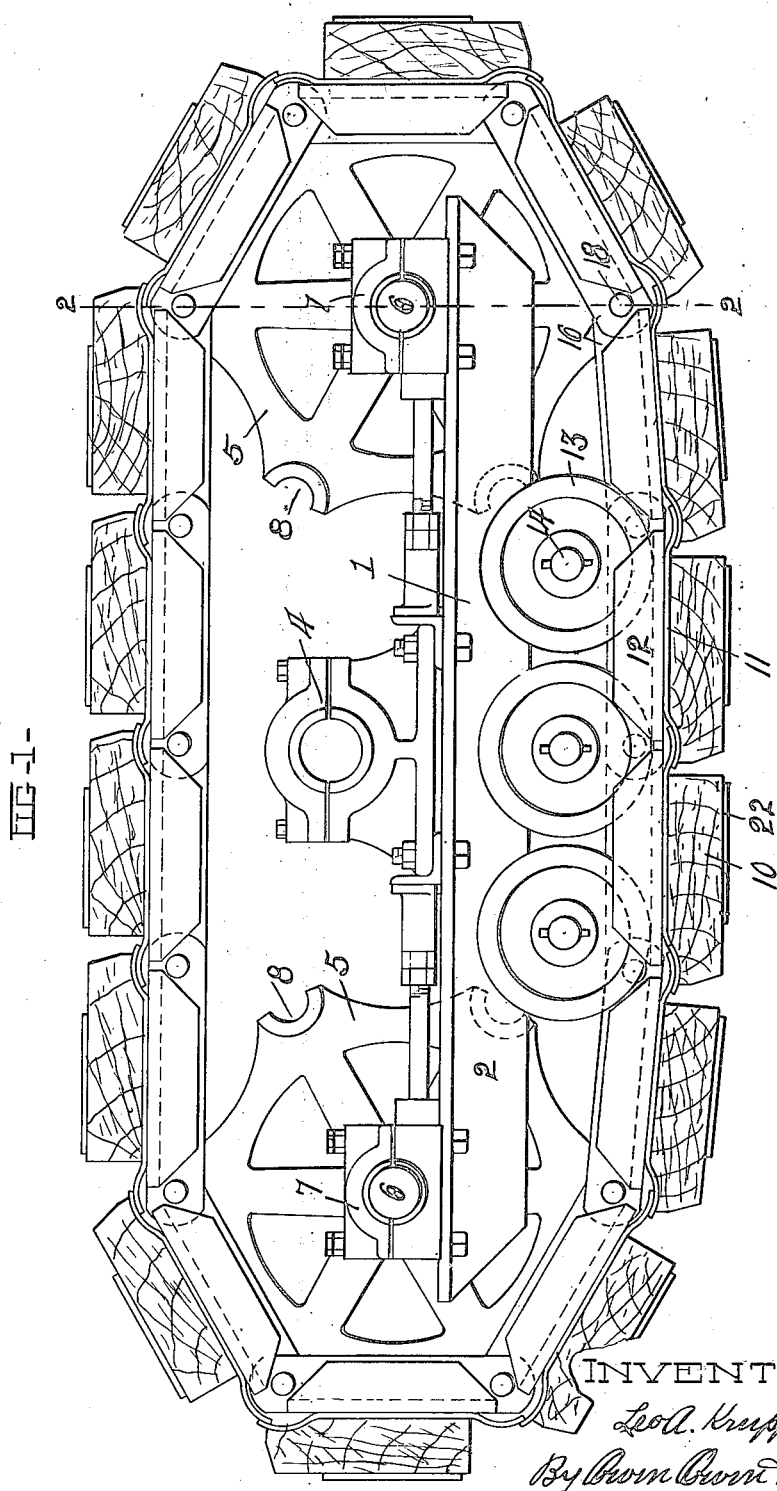

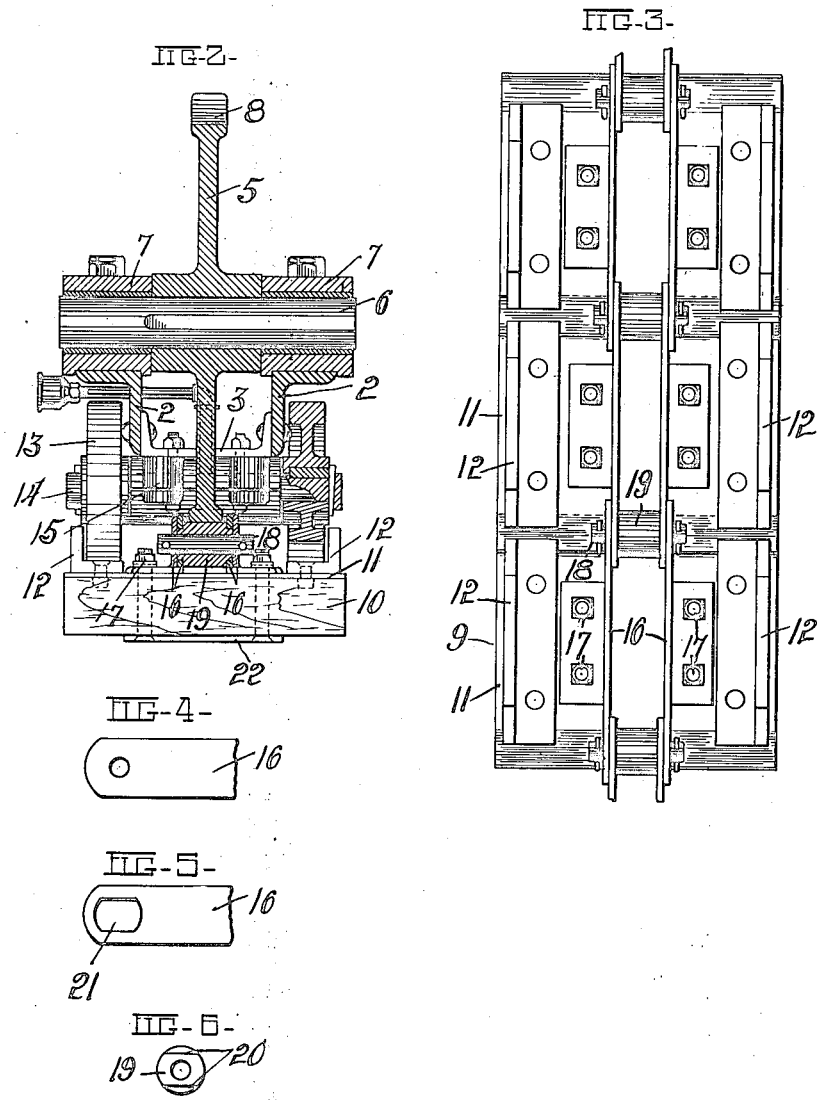

LEO A. KRUPP, OF FINDLAY, OHIO, ASSIGNOR OF ONE-HALF TO THE BUCKEYE TRACTION DITCHER COMPANY, OF FINDLAY, OHIO, A CORPORATION OF OHIO.

APRON WHEEL.

1,419,390.

Specification of Letters Patent. Patented June 13, 1922.

Application filed December 3, 1920. Serial No. 428,043.

*To all whom it may concern:*

Be it known that I, LEO A. KRUPP, a citizen of the United States, and a resident of Findlay, in the county of Hancock and State of Ohio, have made an invention appertaining to Apron Wheels; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to tractor wheels of the apron type, and has for its primary object to simplify, lighten and cheapen the construction thereof without material detriment to its strength and efficiency, and also to strengthen and brace the lower reach or tread portion of the apron against lateral twisting strains.

The invention is fully described in the following specification, and while in its broader aspect it is capable of embodiment in numerous forms, a preferred embodiment thereof is illustrated in the accompanying drawings, in which,—

Figure 1 is a side elevation of a tractor wheel unit embodying the invention. Fig. 2 is a vertical cross-section thereof on the line 2—2 in Fig. 1, with the upper reach of the belt removed. Fig. 3 is an inner plan view of three of the link members of the tread belt. Figs. 4 and 5 are fragmentary side views of a pair of pivotally connecting members of the tread belt, and Fig. 6 is an end view of one of the ratchet wheel engaging members of the belt.
Referring to the drawings, 1 designates the frame of the apron wheel, which frame is formed, in the present instance, by the two transversely spaced longitudinally extending beams 2, 2 formed of angle-iron and having their vertical webs rigidly connected at their lower edge portions by a channel bar 3, the channel of which is disposed upward. The channel bar 3 is of less length than the side bars 2, 2 to provide an open space between the beams at each end thereof. A bearing 4 is mounted centrally on the top of the frame 1 for receiving the customary carrying axle, about the axle of which the frame is adapted to rock.
A sprocket-wheel 5 is provided in the space between the beams at each end thereof, having its shaft 6 journaled in bearings 7 fixed to the respective beam ends. Each sprocket wheel has suitably spaced tread chain engaging recesses 8 in its periphery.

The endless apron or tread belt connecting the sprocket wheels 5 and driven by a rotating driving action of one of said wheels, as is well understood in the art, comprises a plurality of links 9 pivotally connected together. Each link in the present instance, comprises a plank or tread member 10, which is bolted to the outer side of a carrying plate 11. This plate has its ends in interengaging rotary sliding engagement with the ends of like plates of adjoining links to provide a mud guard protection between the links in outer encircling relation to the link pivots, as is well understood in the art. Each link plate 11 has a track flange 12 secured to its inner side adjacent to each side edge thereof, said track flange being formed by an angle iron strip, the horizontal portion of which projects inwardly and forms the track for receiving the outward pressure of an associated set of pressure rolls hereinafter described, while the vertical flange of the angle iron projects inward with respect to the link at the outer edge of the horizontal portion. The ends of the vertical or outer side flanges of the members 12 are mitered as shown. The track members are riveted or otherwise suitably secured to the plate 11 and longitudinally aligned with the other members of the set to coact with and receive the outward pressure of the respective sets of pressure rolls 13 on the frame 1. The pressure rolls are loosely journaled on the outer ends of spindles 14, which are carried crosswise of the frame in suitable bearings 15 secured to the under side of the frame member 3. The spindles 14 in the present instance, are three in number, so that each set of pressure wheels comprises three in number. It will be understood that the pressure wheels coact with the lower reach of the tread apron or belt to maintain it in suitably spaced relation to the frame intermediate the sprocket wheels.

The sprocket engaging means or chain of the apron comprises a pair of angle-iron strips 16 secured to the inner side of each plate 11 centrally between the track flanges 12 in parallel relation thereto and in spaced relation to each other. The horizontal flange of each strip 16 extends outward from the strip and is secured to the plate 11 and plank 10 by bolts 17. The vertical or inwardly projecting flange of each strip 16 is extended at its ends beyond the horizontal flange thereof so as to lap the sides of the registering strip flange on the adjoining link as shown. A pivot pin 18 connects the lapped ends of adjoining pairs of strips 16 and each of these pins is provided intermediate the strips with a roller or sprocket wheel engaging member 19. In order to prevent a turning of the member 19 within the strips against which it ends abut, the roller is flattened or mutilated at each end as shown at 20 (Fig. 6), to adapt it to fit within a corresponding opening 21 in the strips 16 with which its ends abut. The rollers 19 are intended to engage within the peripheral recesses 8 of the sprocket wheels as they pass around the sprocket wheel axes. The bolts 17 which secure the chain link strips 16 to the tread members are also utilized for securing a wear plate 22 to the outer side of each plank 10.

It is evident that I have provided an apron wheel having a single pair of sprocket-wheels, instead of the two pair usually employed, and that instead of employing a single set of pressure rolls in coaction with the central portion of the belt, two sets are employed, one adjacent to each side edge of the belt, so that a uniform pressure is exerted on opposite side edges of a belt link when traversing the lower reach of the belt, thereby preventing the side tilting action of the belt links relative to the frame, which is permitted when a single centrally disposed set of pressure rolls is employed.

I wish it understood that my invention is not limited to any specific construction, arrangement or form of parts, as it is capable of numerous modifications and changes without departing from the spirit of the claim.

Having thus described my invention, what I claim as new, and desire to secure by Letters Patent, is,—

An apron wheel comprising a frame having a central bearing, a set of pressure rolls carried by the frame at each side thereof and intermediate its ends, a sprocket-wheel carried by the frame at each end, an endless tread belt connecting the sprocket wheels and guided thereby and by the pressure rolls, said belt comprising a plurality of successively arranged tread members, a plate secured to the inner side of each tread member and having a curved extension at one end lapping a curved end portion of a plate of an adjoining tread member, a pair of transversely spaced chain link strips of angle iron fixed to the inner side of each plate, adjacent the longitudinal center line of a tread member and extending lengthwise of the tread member, means pivotally connecting the adjacent ends of the link strips of adjoining tread members, an angle iron track member secured to each plate at opposite sides of the chain link strips with one flange of each track member forming a track section for the pressure rolls and with the other flange of each track member projecting inward from the plate at the outer edge portion of the track member to form guard flange.

In testimony whereof I have hereunto signed my name to this specification.

LEO A. KRUPP.